United States Patent [19]

Sekiguchi

[11] 4,033,674
[45] July 5, 1977

[54] ZOOM LENS HAVING A WIDE MAGNIFICATION VARIATION RANGE

[75] Inventor: Takeshi Sekiguchi, Tokyo, Japan

[73] Assignee: Canon Kabushiki Kaisha, Tokyo, Japan

[22] Filed: Mar. 21, 1974

[21] Appl. No.: 453,507

[30] Foreign Application Priority Data

Mar. 23, 1973 Japan .............................. 48-33311

[52] U.S. Cl. ............................... 350/184; 350/186
[51] Int. Cl.[2] ......................................... G02B 15/18
[58] Field of Search ................ 350/184, 186, 40–44

[56] References Cited

UNITED STATES PATENTS

| | | | |
|---|---|---|---|
| 3,015,988 | 1/1962 | Hemstreet | 350/184 X |
| 3,081,671 | 3/1963 | Cook | 350/186 |
| 3,820,876 | 6/1974 | Macher | 350/184 |
| 3,912,373 | 10/1975 | Macher | 350/184 |

FOREIGN PATENTS OR APPLICATIONS

374  1/1971  Japan .............................. 350/184

Primary Examiner—John K. Corbin
Assistant Examiner—Conrad Clark
Attorney, Agent, or Firm—Toren, McGeady and Stanger

[57] ABSTRACT

A front zoom system and a rear zoom system are coupled in said order from an object side, wherein said rear zoom system comprises a fixed positive lens group, a negative compensator lens group in which its first plane has its convex plane facing an object side and its last plane has its concave plane facing an image side, a negative variator lens group in which the lens group itself is virtually achromated, and a fixed relay lens group, being positioned in the order given from an object side. While the magnification variation range is enlarged by consecutively performing the zooming operation of the front zoom system and the zooming operation of the rear zoom system, aberrations at that time are satisfactorily corrected. The focal distance of the variator lens group is made short in comparison with that of the compensator lens group, thus the amount of shifting of this lens group is reduced for making the rear zoom system compact.

9 Claims, 29 Drawing Figures

SPHERICAL ABERRATION

ASTIGMATISM

DISTORTION ABERRATION

FIG.3A1   FIG.3A2   FIG.3A3

SPHERICAL ABERRATION

FIG.3B1   FIG.3B2   FIG.3B3

ASTIGMATISM

FIG.3C1   FIG.3C2   FIG.3C3

DISTORTION ABERRATION

SPHERICAL ABERRATION

ASTIGMATISM

DISTORTION ABERRATION

4,033,674

ZOOM LENS HAVING A WIDE MAGNIFICATION VARIATION RANGE

BACKGROUND OF INVENTION

The present invention is related to a zoom lens in which the magnification variation range as employed in an ordinarily used zoom lens is further enlarged and at the same time the magnification variation with an enlarged ranged can be consecutively done.

An ordinary zoom lens consists of a zoom part to determine the variation ratio of focal distance and a relay part to determine the variation range of focal distance, and has for example, zooming range of 50 mm to 500 mm.

However, there are such cases that zooming range of 100 mm to 1000 mm is desired during photographing, and at that time what is ordinarily done is to replace a relay part or to add a magnifying lens system in front of the zoom part or between the zoom part and the relay part. But such method has disadvantages that replacing of the relay part or mounting of the magnifying lens system takes time, and further the photographing image is cut out in a course of photographing when said parts are mounted.

Contrary to the above art, a technical thought that a relay part is replaced with another zoom lens so that the front zoom part with M times power and the rear zoom part with N times power are connected together to obtain a zoom lens with M × N times power has been known for example by the Japanese Utility Model Pat. No. Sho 40-2871.

SUMMARY OF THE INVENTION

An object of the present invention is to shorten the total length of a zoom lens by placing plural number of movable lens groups at a rear zoom part and the movable lens groups corrects image plane shifting at an object side and the movable lens group varys the focal distance at an image side as the lens group of divergent nature. Another object of the invention is to secure satisfactory aberration correction even when the total length is shortened.

BRIEF DESCRIPTION OF DRAWINGS

FIGS. 2A1, 2A2, and 2A3 (collectively FIGS. 2A); FIGS. 2B1, 2B2, and 2B3) (collectively FIGS. 2B); and FIGS. 2C1, 2C2, and 2C3 (collectively FIGS. 2C) are drawings for various aberrations of example 1 of actual values according to the concrete example of FIG. 1.

FIGS. 3A1, 3A2 and 3A3 (collectively FIGS. 3A); FIGS. 3B1, 3B2, and 3B3 (collectively FIGS. 3B); and FIGS. 3C1, 3C2, and 3C3 (collectively FIGS. 3C) are drawings for various aberrations of example 2 of actual values. FIGS. 5A1, 5A2, and 5A3 (collectively FIGS. 5A); FIGS. 5B1, 5B2, and 5B3 (collectively FIGS. 5B); and FIGS. 5C1, 5C2, and 5C3 (collectively FIGS. 5C) are drawings for various aberrations of the example 3 of actual values according to FIG. 4.

DESCRIPTION OF PREFERRED EMBODIMENTS

Figure 1:
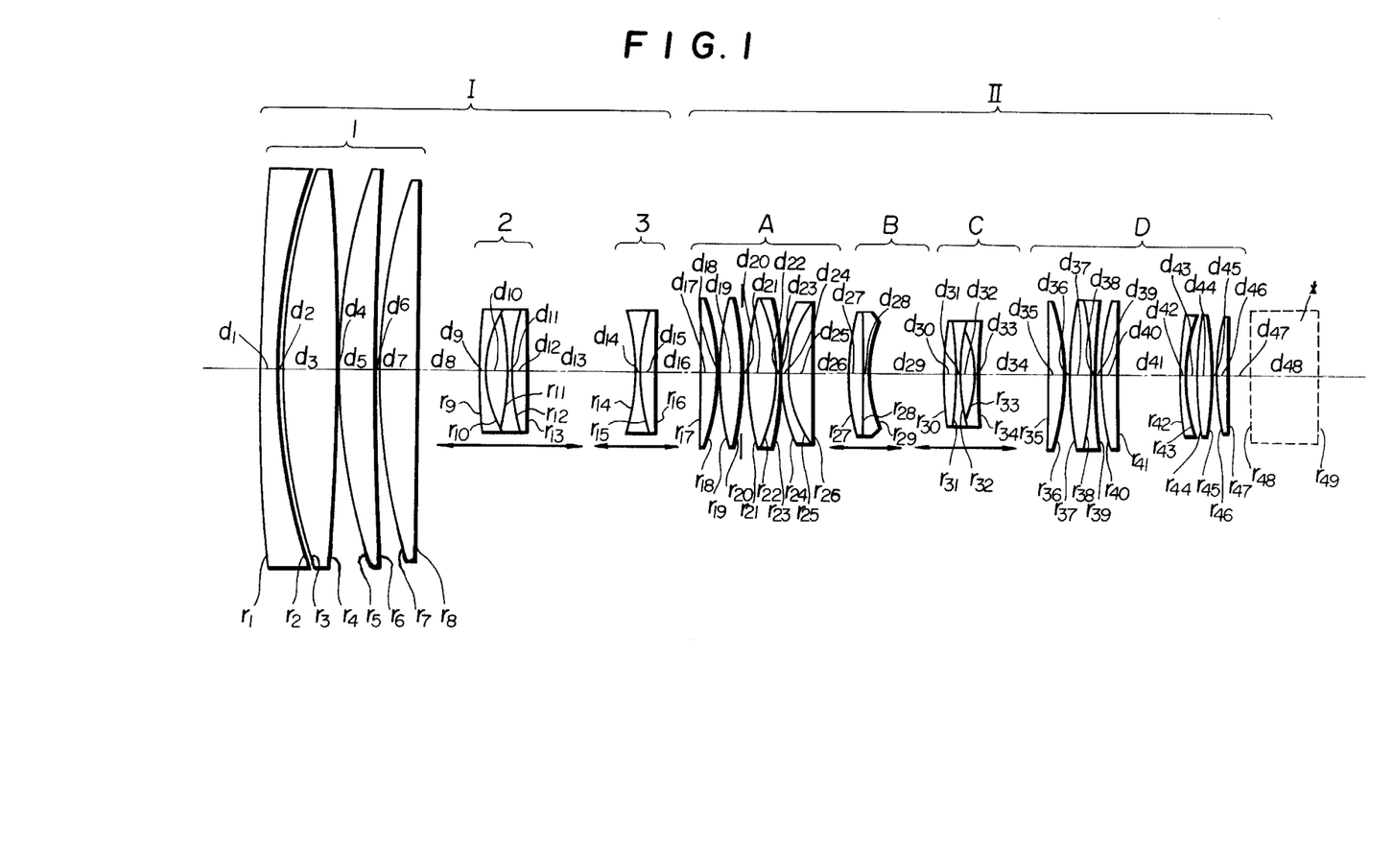
FIG. 1 is a cross-sectional view showing a concrete example of the present invention.

Now, examples of the present invention will be explained. Here, a rear fixed relay part is made as a zoom lens system of a front diaphragm type having a diaphragm at the front part by providing plural number of divergent type lens systems which can move relatively from one direction to the other within a lens system which is equivalent to a rear fixed relay part. And of the image magnification variation of each divergent lens system itself, which is generated as a result of shifting of the lens group when the above mentioned divergent lens system is shifted from one direction to the other, the lens system with great influence over image magnificaton variation is made to a focal distance variation lens system, while other lens systems are made an imaging plane shifting correction lens system, then in this rear zoom lens system of a front diaphragm type the lens system for correcting the imaging plane shifting is placed at a position closer to an object than that from the focal distance variation lens system. In FIG. 1, I is a front zoom part, and II is a rear zoom part and is connected to the front zoom part I. Also the front zoom part I has a convergent lens system 1, and divergent lens systems 2 and 3, while the rear zoom part II has a front fixed lens system A having a diaphragm between two positive lens groups, a lens system B for correcting imaging plane shifting, a focal distance variation lens system C and a rear fixed lens system D. Here, the front zoom part I may be of different structure than what is mentioned above.

In the above mentioned set-up, the focal distance variation lens system C is in itself an almost achromated divergent lens system and has at least one each of a divergent lens and a convergent lens, having at least two divergent planes and one covergent plane, wherein by making the refractive index of the convergent lens and the divergent lens more than 1.75 or by making the difference in Abbe number of the convergent lens and the divergent lens more than 15 the correction of Petzual sum, spherical aberration, coma (aberration) and distortion aberration is intended. As this focal distance variation lens system C is shifted to change its position, the amount of variation of aberration increases remarkably unless each aberration of the lens system C only is corrected to a certain satisfactory level.

It is desired that when the shortest focal distance of the total lens system which consists of the front zoom part I and the rear zoom part II is made f and the focal distance of the focal distance variation lens system C is made fc, the equation $$0.5f \leq |fc|$$

is satisfied. If the focal distances do not fall within the above mentioned range the amount of variation in aberration can not be allowed, while when the equation, $$|fc| < 4f$$

is not satisfied, the size of the rear zoom lens part II which is determined by the amount of shifting of the lens system C becomes too large to be allowed, thus it is very inconvenient in practical use.

Also the lens system B for correcting image plane shifting is a divergent lens system, and when the plane from which light is exited out is made to have divergent function it is advantageous for correction of spherical aberration. And when the synthesized focal distance of the lens system B for correcting imaging plane shifting is made fB, it is desired that the following equation is satisfied:

$$|fB| \geq |1.5 fc|$$

(wherein fc is a synthesized focal distance of the focal distance varying lens system C). When |fB| is smaller than |1.5fc|, the amount of aberration can not be allowed. Further, the rear fixed lens system D is a convergent lens system and is for example separated into two groups of front and rear groups and it is better to use a lens with a refractive index of 1.63 or less as a convergent less consisting of the lens system, and to use a lens with refractive index of 1.75 or larger as a divergent lens. And by providing a divergent plane having a curvature center at an object side in the front group and at an imaging plane side in the rear group, correction of Petsval sum, spherical aberration, coma (aberration) and distortion aberration can be done advantageously.

Also the front fixed lens system A has its focal distance so determined that an imaging point by the front zoom part I takes a position suitable as an object point of the lens system B for correcting imaging plane shifting, and it is advantageous in many cases to secure balancing of the aberration correction of the total lens system consisting of the front zoom part I and the rear zoom part II in this front fixed lens system A. However in the case when the aberration correction of the front zoom part I is satisfactorily done and the imaging point by the front zoom part I is at a position suitable as an object point of B, the above mentioned front fixed lens system A may be omitted.

When the elements of the rear zoom lens part are selected as in the embodiment of FIG. 1, an axial luminous flux passes the front zoom part I and the front fixed lens system A. The flux is incident upon the lens system B for correction of imaging plane shifting in a state of convergent light and will be projected from the same with its state of convergence somewhat weakened then will be incident into the focal distance variation lens system C then will be projected from the lens system C in a stage of divergent light. Therefore as the lens system B and C are within convergent luminous flux the height from the optical axis in the case when the light beam passes through these lens systems to the light beam can be lowered, thus the effective diameter of lens can be made small. That is according to Matsui's theme on aberration, tertial spherical aberration is in proportion to the cube of diameter while coma (aberration) is proportional to the square of the diameter. From this when the effective diameter of lens is small, even if the focal distance of lens is shortened, aberration can be satisfactorily corrected. Also it is convenient for reducing the length of the rear zoom lens part II to shorten the focal distance of the focal distance variation lens C and to reduce the amount of shifting, and if the focal distance of the lens system C becomes long the incident height of oblique luminous flux becomes high, not only increasing the diameter of the lens system D but increasing the total length, thus very disadvantageous.

As has been explained above the present invention is quite useful in that the replacement of the rear fixed relay part and the mounting of the converter, etc. are not necessary and it becomes possible to consecutively enlarge the magnification variation range of the front zoom part using the rear fixed relay part as the zoom lens system of front diaphragm type, furthermore the rear zoom part comes in a very compact size.

Figure 2A:
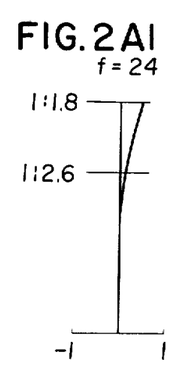
Figure 2A:
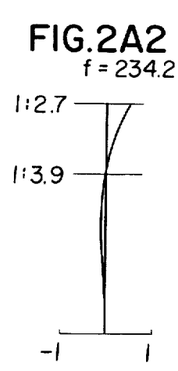
Figure 2A:
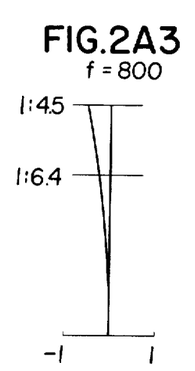
Figure 2B:
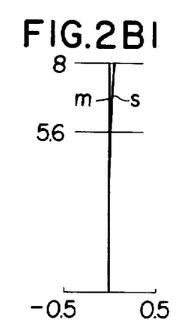
Figure 2B:
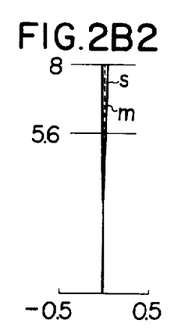
Figure 2B:
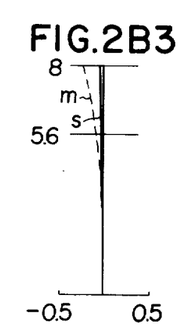
Figure 2C:
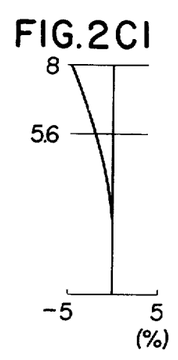
Figure 2C:
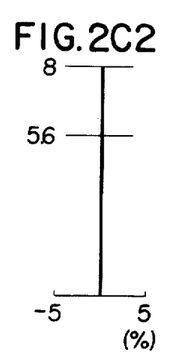
Figure 2C:
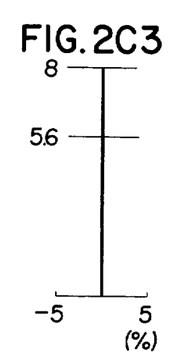

Now actual values on concrete examples will be shown and satisfactorily corrected aberration will be shown in FIG. 2A, FIG. 2B and FIG. 2C.

Example 1 of Actual Values:
Focal distance: 24 to 800
Zooming ratio : 1 : 33.3
Relative aperture: 1 : 1.8 to 1: 4.5
(shortest focal distance to longest focal distance)
Effective picture size: 16 φ

| | r | d | n | ν |
|---|---|---|---|---|
| 1 | 1086.39 | | | |
| | | 8 | 1.7552 | 27.5 |
| 2 | 283.68 | | | |
| | | 1.48 | | |
| 3 | 280.91 | | | |
| | | 23.31 | 1.51633 | 64.1 |
| 4 | −1173.26 | | | |
| | | 0.2 | | |
| 5 | 289.546 | | | |
| | | 17.62 | 1.51633 | 64.1 |
| 6 | 1566.37 | | | |
| | | 0.2 | | |
| 7 | 278.268 | | | |
| | | 13.27 | 1.51633 | 64.1 |
| 8 | 921.892 | | | |
| | ( * 0.5517 − 183.958 − 228.885) | | | |
| 9 | 364.93 | | | |
| | | 3 | 1.816 | 46.8 |
| 10 | 70.69 | | | |
| | | 9 | | |
| 11 | −87 | | | |
| | | 2.52 | 1.816 | 46.8 |
| 12 | 96.245 | | | |
| | | 6 | 1.92286 | 20.9 |
| 13 | −788.25 | | | |
| | ( * 235.681 − 29.5934 − 7.3484 ) | | | |
| 14 | −101.8 | | | |
| | | 3.02 | 1.7859 | 44.2 |
| 15 | 100.08 | | | |
| | | 10 | 1.80518 | 25.4 |
| 16 | −3088 | | | |
| | ( * 5.9945 − 28.6778 − 5.9945) | | | |
| 17 | −2040 | | | |
| | | 6 | 1.48749 | 70.1 |
| 18 | −104.18 | | | |
| | | 0.2 | | |
| 19 | 261.69 | | | |
| | | 6.5 | 1.48749 | 70.1 |
| 20 | −200.33 | | | |
| | | 3.511 | | |
| 21 | 234.581 | | | |
| | | 12.782 | 1.60311 | 60.7 |
| 22 | −88.1214 | | | |
| | | 3.5 | 1.80518 | 25.4 |
| 23 | −289.98 | | | |
| | | 0.2 | | |
| 24 | 79.5158 | | | |
| | | 3 | 1.7552 | 27.5 |
| 25 | 54.7653 | | | |
| | | 10.473 | 1.62041 | 60.3 |
| 26 | 431.943 | | | |
| | ( * 13.1102 − 17.6795 − 16.5754) | | | |
| 27 | 138.145 | | | |
| | | 5.957 | 1.71736 | 29.5 |
| 28 | −633.921 | | | |
| | | 2.5 | 1.72 | 50.3 |
| 29 | 59.18 | | | |
| | ( * 7.1707 − 26.2014 − 43.7055 ) | | | |
| 30 | 123.27 | | | |
| | | 4.772 | 1.92286 | 21.3 |
| 31 | −382.77 | | | |
| | | 2.5 | 1.816 | 46.8 |
| 32 | 69.0452 | | | |
| | | 6.815 | | |
| 33 | −74.2236 | | | |
| | | 2.5 | 1.816 | 46.8 |
| 34 | 413.701 | | | |
| | ( * 42.8562 − 19.2562 − 2.8562 ) | | | |
| 35 | −600.211 | | | |
| | | 7.736 | 1.60311 | 60.7 |
| 36 | −109.249 | | | |
| | | 0.2 | | |
| 37 | 146.829 | | | |
| | | 11.823 | 1.60311 | 60.7 |
| 38 | −139.73 | | | |
| | | 3 | 1.80518 | 25.4 |
| 39 | 1373.05 | | | |
| | | 0.2 | | |

Example 1-continued of Actual Values:
- Focal distance: 24 to 800
- Zooming ratio : 1 : 33.3
- Relative aperture: 1 : 1.8 to 1 : 4.5
  (shortest focal distance to longest focal distance)
- Effective picture size: 16 $\phi$

| | r | d | n | ν |
|---|---|---|---|---|
| 40 | 129.318 | | | |
| | | 7.872 | 1.60311 | 60.7 |
| 41 | 1539.52 | | | |
| | | 29.808 | | |
| 42 | 110.432 | | | |
| | | 3 | 1.71736 | 29.5 |
| 43 | 70.8992 | | | |
| | | 6.566 | | |
| 44 | 162.808 | | | |
| | | 6.778 | 1.51633 | 64.1 |
| 45 | −360.162 | | | |
| | | 0.2 | | |
| 46 | 79.4534 | | | |
| | | 7.974 | 1.51633 | 64.1 |
| 47 | 347.566 | | | |
| | | 20 | | |
| ※ ⎧ 48 | ∞ | | | |
| | | 69.2 | 1.51633 | 64.1 |
| ⎩ 49 | ∞ | | | |

The values with * marks show the cases of shortest, middle and longest focal distances. The asterisk marks ※ show a color resolving prism system. But, r is a radius of curvature, d is a plane separation or lens thickness, n is refractive index and ν is dispersion.

Example 2 of Actual Values:
- Focal distance: 24 to 801.5
- Zooming ratio: 1 : 33.3
- Relative aperture: 1 : 1.8 to 1 : 4.5
  (shortest focal distance to longest focal distance)
- Effective plane size: 16 $\phi$

| | r | d | n | μ |
|---|---|---|---|---|
| 1 | 1086.39 | | 1.7552 | 27.5 |
| | | 8 | | |
| 2 | 283.68 | | | |
| | | 1.48 | | |
| 3 | 280.91 | | 1.51633 | 64.1 |
| | | 23.31 | | |
| 4 | −1173.26 | | | |
| | | 0.2 | | |
| 5 | 289.546 | | 1.51633 | 64.1 |
| | | 17.62 | | |
| 6 | 1566.37 | | | |
| | | 0.2 | | |
| 7 | 278.268 | | 1.51633 | 64.1 |
| | | 13.27 | | |
| 8 | 921.892 | | | |
| | ( 0.5517 − 183.9578 − 228.8848 ) | | | |
| 9 | 364.93 | | 1.816 | 46.8 |
| | | 3 | | |
| 10 | 70.69 | | | |
| | | 9 | | |
| 11 | −87 | | 1.816 | 46.8 |
| | | 2.52 | | |
| 12 | 96.245 | | 1.92286 | 20.9 |
| | | 6 | | |
| 13 | −788.25 | | | |
| | ( 235.6815 − 29.5934 − 7.3484 ) | | | |
| 14 | −101.8 | | 1.7859 | 44.2 |
| | | 3.02 | | |
| 15 | 100.08 | | 1.80518 | 25.4 |
| | | 10 | | |
| 16 | −3088 | | | |
| | ( 5.9945 − 28.6778 − 5.9945 ) | | | |
| 17 | −2040 | | 1.48749 | 70.1 |
| | | 6 | | |
| 18 | −104.18 | | | |
| | | 0.2 | | |
| 19 | 261.69 | | 1.48749 | 70.1 |
| | | 6.5 | | |
| 20 | −200.33 | | | |
| | | 4.78 | | |
| 21 | 202.224 | | 1.60311 | 60.7 |
| | | 13.37 | | |
| 22 | −97.715 | | 1.80518 | 25.4 |
| | | 3.5 | | |
| 23 | −786.13 | | | |
| | | 0.2 | | |
| 24 | 73.177 | | 1.7552 | 27.5 |
| | | 3 | | |
| 25 | 52.795 | | 1.62041 | 60.3 |

Example 2-continued of Actual Values:
- Focal distance: 24 to 801.5
- Zooming ratio: 1 : 33.3
- Relative aperture: 1 : 1.8 to 1 : 4.5
  (shortest focal distance to longest focal distance)
- Effective plane size: 16 $\phi$

| | r | d | n | μ |
|---|---|---|---|---|
| | | 10.43 | | |
| 26 | 325.572 | | | |
| | ( 10.0755 − 14.3473 − 13.5601 ) | | | |
| 27 | 12.893 | | 1.71736 | 29.5 |
| | | 6.59 | | |
| 28 | −326.227 | | 1.72 | 50.3 |
| | | 2.5 | | |
| 29 | 52.351 | | | |
| | ( 5.9359 − 39.0442 − 62.4514 ) | | | |
| 30 | 103.145 | | 1.92286 | 21.3 |
| | | 5.75 | | |
| 31 | 676.097 | | 1.816 | 46.8 |
| | | 2.5 | | |
| 32 | 67.592 | | | |
| | | 7.06 | | |
| 33 | 31 87.405 | | 1.816 | 46.8 |
| | | 2.5 | | |
| 34 | −949.076 | | | |
| | ( 62 − 24.6 − 2 ) | | | |
| 35 | −521.814 | | 1.60311 | 60.7 |
| | | 7.39 | | |
| 36 | −106.58 | | | |
| | | 0.2 | | |
| 37 | 154.335 | | 1.60311 | 60.7 |
| | | 12.72 | | |
| 38 | −137.301 | | 1.80518 | 25.4 |
| | | 3 | | |
| 39 | 1437.934 | | | |
| | | 0.2 | | |
| 40 | 129.132 | | 1.60311 | 60.7 |
| | | 8.55 | | |
| 41 | 8613.412 | | | |
| | | 30.01 | | |
| 42 | 92.371 | | 1.71736 | 29.5 |
| | | 3 | | |
| 43 | 68.499 | | | |
| | | 8.43 | | |
| 44 | 319.795 | | 1.51633 | 64.1 |
| | | 3.77 | | |
| 45 | 396.717 | | | |
| | | 0.2 | | |
| 46 | 70.644 | | 1.51633 | 64.1 |
| | | 7.94 | | |
| 47 | 348.921 | | | |
| | | 23 | | |
| 48 | | | 1.51633 | 64.1 |
| | | 69.2 | | |
| 49 | | | | |

Figure 3A:
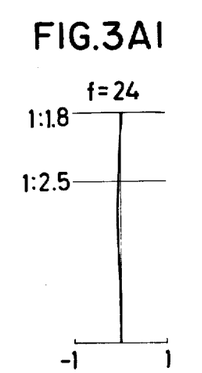
Figure 3A:
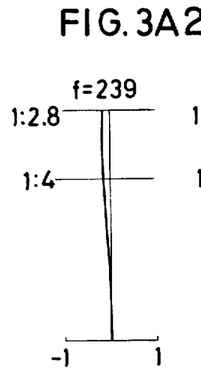
Figure 3A:
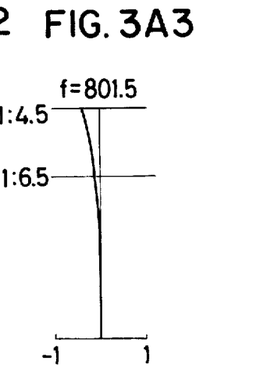
Figure 3B:
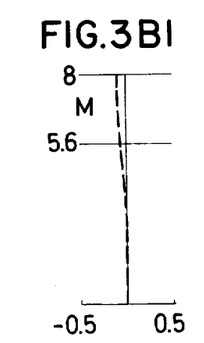
Figure 3B:
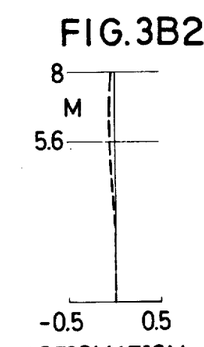
Figure 3B:
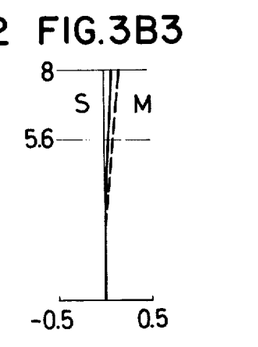
Figure 3C:
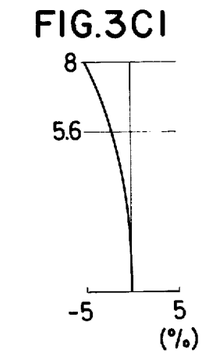
Figure 3C:
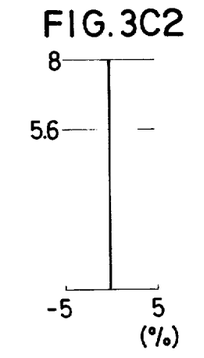
Figure 3C:
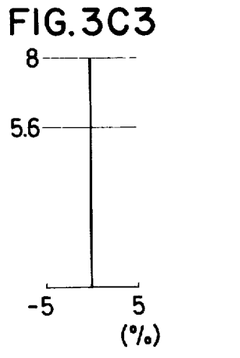

The state of various aberrations for the above example 2 of actual values is shown in FIG. 3A, FIG. 3B and FIG. 3C.

Figure 4:
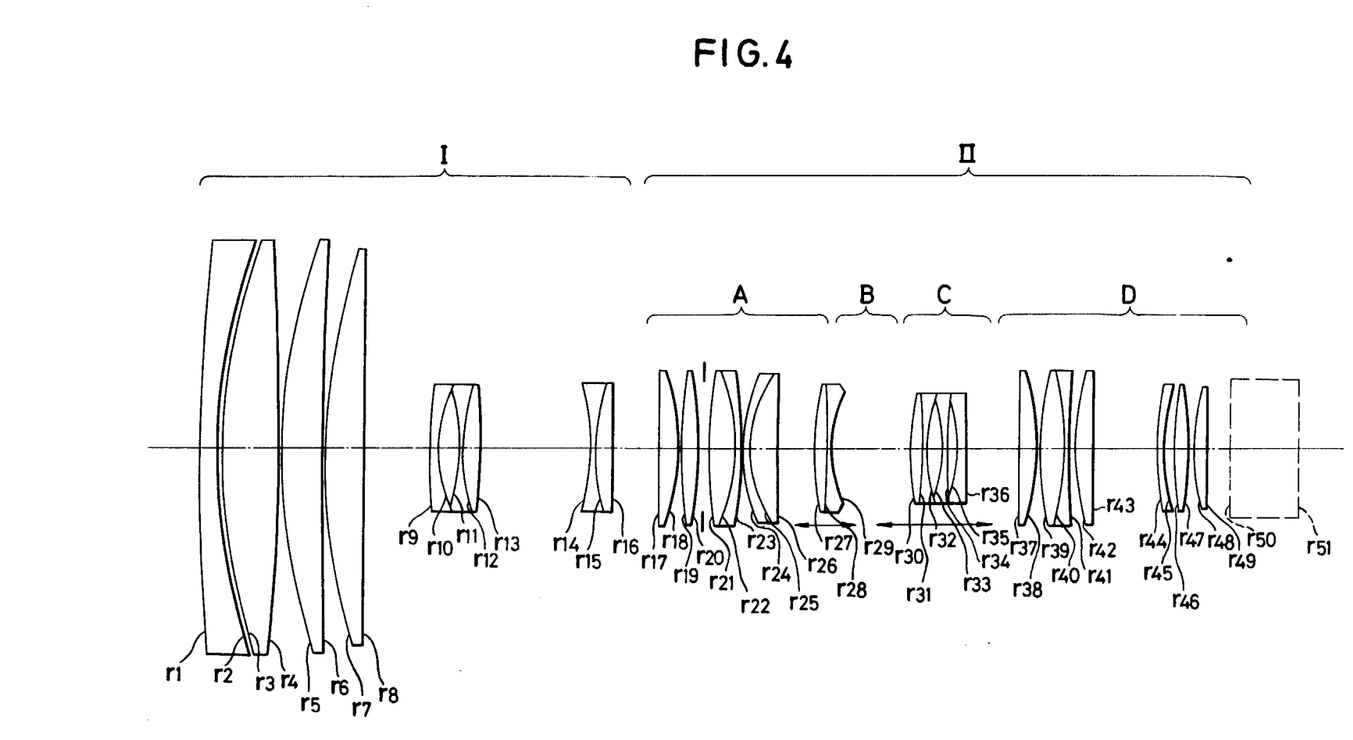
FIG. 4 is a drawing to show another example of the present invention.

Example 3 of Actual Values:
(According to Example shown in FIG. 4)
- Focal distance: 24 to 798.16
- Zooming ratio: 1 : 33.3
- Relative aperture: 1 : 1.8 to 1 : 45
  (shortest focal distance to longest focal distance)
- Effective plane diameter: 16 $\phi$

| | r | d | n | μ |
|---|---|---|---|---|
| 1 | 1086.39 | | 1.7552 | 27.5 |
| | | 8 | | |
| 2 | 283.68 | | | |
| | | 1.48 | 1.51633 | 64.1 |
| 3 | 280.91 | | | |
| | | 23.31 | | |
| 4 | −1173 | | | |
| | | 0.2 | 1.51633 | 64.1 |
| 5 | 289.546 | | | |
| | | 17.62 | | |
| 6 | 1566.37 | | | |
| | | 0.2 | 1.51633 | 64.1 |
| 7 | 278.268 | | | |
| | | 13.27 | | |
| 8 | 921.723 | | 1.816 | 46.8 |
| | ( 0.551 − 183.9571 − 228.884 ) | | | |
| 9 | 364.93 | | | |

Example 3-continued of Actual Values:
(According to Example shown in FIG. 4)
Focal distance: 24 to 798.16
Zooming ratio: 1 : 33.3
Relative aperture: 1 : 1.8 to 1 : 45
(shortest focal distance to longest focal distance)
Effective plane diameter: 16 φ

| | r | d | n | μ |
|---|---|---|---|---|
| 10 | 70.69 | | | |
| | | 3 | | |
| 11 | −87 | | | |
| | | 9 | 1.816 | 46.8 |
| 12 | 96.245 | | | |
| | | 2.52 | 1.92286 | 20.9 |
| 13 | −788.25 | | | |
| | | 6 | | |
| 14 | −1018 | ( 235.6815 − 29.5934 − 7.3484 ) | | |
| | | | 1.7859 | 44.2 |
| | | 3.02 | | |
| 15 | 100.08 | | | |
| | | | 1.80518 | 25.4 |
| | | 10 | | |
| 16 | −3088 | | | |
| 17 | −2040 | ( 5.9945 − 28.6778 − 5.9945 ) | | |
| | | | 1.48749 | 70.1 |
| | | 6 | | |
| 18 | −104.18 | | | |
| | | 0.2 | | |
| 19 | 261.69 | | | |
| | | | 1.48749 | 70.1 |
| | | 6.5 | | |
| 20 | −200.33 | | | |
| | | 9.11 | | |
| 21 | 148.764 | | | |
| | | 11.38 | 1.64 | 60.2 |
| 22 | −96.819 | | 1.80518 | 25.4 |
| | | 3.5 | | |
| 23 | −786.13 | | | |
| | | 0.2 | | |
| 24 | 63.7 | | | |
| | | | 1.80518 | 25.4 |
| | | 3 | | |
| 25 | 52.23 | | | |
| | | | 1.67 | 57.4 |
| | | 11.04 | | |
| 26 | 634.933 | | | |
| 27 | 6990.557 | ( 20.5044 − 25.3528 − 23.0322 ) | | |
| | | | 1.71736 | 29.5 |
| | | 3.31 | | |
| 28 | 8734.535 | | 1.72 | 50.3 |
| | | 2.5 | | |
| 29 | 141.047 | | | |
| 30 | 235.509 | ( 4.1573 − 4.7089 − 12.4295 ) | | |
| | | | 1.92286 | 20.9 |
| | | 4.06 | | |
| 31 | −132.187 | | 1.816 | 46.8 |
| | | 2.5 | | |
| 32 | 39.589 | | | |
| | | 8.93 | | |
| 33 | −44.352 | | 1.816 | 46.8 |
| | | 2.5 | | |
| 34 | 176.636 | | | |
| | | 9 | | |
| 35 | −59.367 | | 1.816 | 46.8 |
| | | 2.5 | | |
| 36 | −2642.876 | | | |
| 37 | −753.452 | ( 12.8 − 7.4 − 2 ) | | |
| | | | 1.60311 | 60.7 |
| | | 15.46 | | |
| 38 | −49.472 | | | |
| | | 0.2 | | |
| 39 | 133.874 | | | |
| | | | 1.60311 | 60.7 |
| | | 11.06 | | |
| 40 | −287.402 | | 1.80518 | 25.4 |
| | | 3.0 | | |
| 41 | 521.457 | | | |
| | | 0.2 | | |
| 42 | 135.472 | | | |
| | | | 1.60311 | 60.7 |
| | | 7.84 | | |
| 43 | −26689.125 | | | |
| | | 35.73 | | |
| 44 | 163.529 | | | |
| | | | 1.71736 | 29.5 |
| | | 3 | | |
| 45 | 68.35 | | | |
| | | 8.24 | | |
| 46 | 149.667 | | | |
| | | | 1.51633 | 64.1 |
| | | 12.82 | | |
| 47 | −151.699 | | | |
| | | 0.2 | | |
| 48 | 58.946 | | | |
| | | | 1.51633 | 64.1 |
| | | 15.84 | | |
| 49 | 362.778 | | | |
| | | 23 | | |
| 50 | ∞ | | | |
| | | | 1.51633 | 64.1 |
| | | 69.2 | | |
| 51 | ∞ | | | |

Figure 5A:
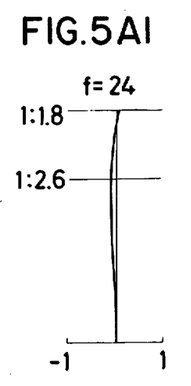
Figure 5A:
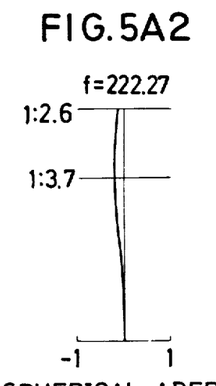
Figure 5A:
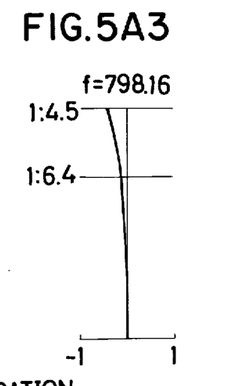
Figure 5B:
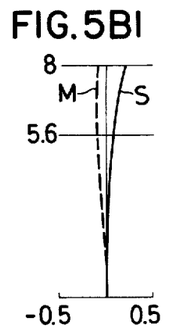
Figure 5B:
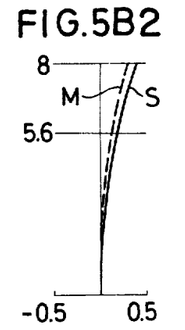
Figure 5B:
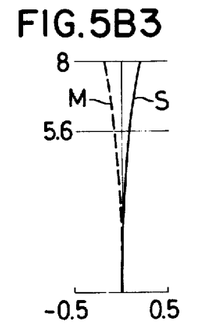
Figure 5C:
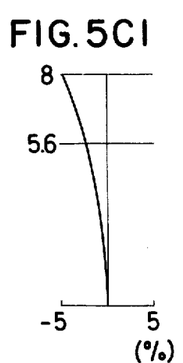
Figure 5C:
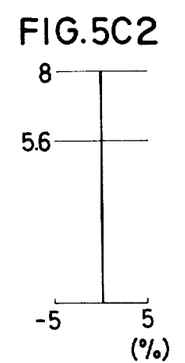
Figure 5C:
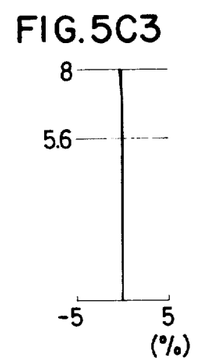

The state of various aberrations for the above example of actual figures is shown in FIG. 5A, FIG. 5B, FIG. 5C.

What is claimed is:

1. A zoom lens having wide variation range, which comprises a front zoom part containing a focusing lens group, a variator lens groups and a compensator lens group said variator lens group and said compensator lens group being displaced simultaneously with as well as independently of each other, and a rear zoom part positioned behind said front zoom part and containing a fixed lens group, at least two divergent movable lens groups and a fixed relay lens group, said divergent movable lens groups being displaced simultaneously with as well as independently of each other, wherein the movable lens group of said two divergent movable lens groups placed at a position closer to the image plane is a lens group to vary the focal length while the movable lens group closer to an object is a lens group for compensation for the shifting of the image plane in the direction of optical axis.

2. The zoom lens having wide variation range according to claim 1, wherein the divergent movable lens group closer to an object is a negative meniscus component having a convex surface facing the object and a concave surface facing the image plane.

3. The zoom lens havig wide variation range according to claim 1, wherein the divergent movable lens group closer to the image plane has at least one each of a divergent lens and a convergent lens and having at least two divergent surfaces and one convergent surface.

4. The zoom lens having wide variation range according to claim 1, wherein the first surface at an object side of the fixed relay lens group is a concave surface facing the object while the last surface at an image plane is a concave surface facing the image plane.

5. The zoom lens having wide variation range according to claim 1, wherein the fixed lens group has a convergent front group and convergent rear group with a diaphragm being sandwiched therebetween, and the last surface of said rear group has its concave surface facing the image plane while the first surface of the above mentioned movable lens group closer to an object has its convex plane facing an object and the last surface thereof has its concave surface facing an image plane, further the first surface of the fixed relay lens group has its concave surface facing an object and the last surface thereof has its concave surface the image plane.

6. A zoom lens as in claim 1, wherein the variator lens group and compensator lens group of the front part each has a negative refractive power and the fixed lens group includes a diaphragm.

7. A zoom lens having wide variation range, which comprises a front zoom part containing a focusing lens group, a variator lens group and a compensator lens group said variator lens group and said compensator lens group being displaced simultaneously with as well as independently of each other, and a rear zoom part positioned behind said front zoom part and containing a fixed lens group, at least two divergent movable lens groups and a fixed relay lens group, said divergent movable lens groups being displaced simultaneously with as well as independently of each other, wherein the movable lens group of said two divergent movable lens groups placed at a position closer to the image plane is a lens group to vary the focal length while the movable lens group closer to an object is a lens group for compensation for the shifting of the image plane in the direction of optical axis the group form a system having lenses with the following characteristics:

| | r | d | n | ν |
|---|---|---|---|---|
| 1 | 1086.39 | | | |
| | | 8 | 1.7552 | 27.5 |
| 2 | 283.68 | | | |
| | | 1.48 | | |
| 3 | 280.91 | | | |
| | | 23.31 | 1.51633 | 64.1 |
| 4 | −1173.26 | | | |
| | | 0.2 | | |
| 5 | 289.546 | | | |
| | | 17.62 | 1.51633 | 64.1 |
| 6 | 1566.37 | | | |
| | | 0.2 | | |
| 7 | 278.268 | | | |
| | | 13.27 | 1.51633 | 64.1 |
| 8 | 921.892 | | | |
| | ( * 0.5517 − 183.958 − 228.885 ) | | | |
| 9 | 364.93 | | | |
| | | 3 | 1.816 | 46.8 |
| 10 | 70.69 | | | |
| | | 9 | | |
| 11 | −87 | | | |
| | | 2.52 | 1.816 | 46.8 |
| 12 | 96.245 | | | |
| | | 6 | 1.92286 | 20.9 |
| 13 | −788.25 | | | |
| | ( * 235.681 − 29.5934 − 7.3484 ) | | | |
| 14 | −101.8 | | | |
| | | 3.02 | 1.7859 | 44.2 |
| 15 | 100.08 | | | |
| | | 10 | 1.80518 | 25.4 |
| 16 | −3088 | | | |
| | ( * 5.9945 − 28.6778 − 5.9945 ) | | | |
| 17 | −2040 | | | |
| | | 6 | 1.48749 | 70.1 |
| 18 | −104.18 | | | |
| | | 0.2 | | |
| 19 | 261.69 | | | |
| | | 6.5 | 1.48749 | 70.1 |
| 20 | −200.33 | | | |
| | | 3.511 | | |
| 21 | 234.581 | | | |
| | | 12.782 | 1.60311 | 60.7 |
| 22 | −88.1214 | | | |
| | | 3.5 | 1.80518 | 25.4 |
| 23 | −289.98 | | | |
| | | 0.2 | | |
| 24 | 79.5158 | | | |
| | | 3 | 1.7552 | 27.5 |
| 25 | 54.7653 | | | |
| | | 10.473 | 1.62041 | 60.3 |
| 26 | 431.943 | | | |
| | ( * 13.1102 − 17.6795 − 16.5754) | | | |
| 27 | 138.145 | | | |
| | | 5.957 | 1.71736 | 29.5 |
| 28 | −633.921 | | | |
| | | 2.5 | 1.72 | 50.3 |
| 29 | 59.18 | | | |
| | ( * 7.1707 − 26.2014 − 43.7055 ) | | | |
| 30 | 123.27 | | | |
| | | 4.772 | 1.92286 | 21.3 |
| 31 | −382.77 | | | |
| | | 2.5 | 1.816 | 46.8 |
| 32 | 69.0452 | | | |
| | | 6.815 | | |
| 33 | −74.2236 | | | |
| | | 2.5 | 1.816 | 46.8 |
| 34 | 413.701 | | | |
| | ( * 42.8562 − 19.2562 − 2.8562 ) | | | |
| 35 | −600.211 | | | |
| | | 7.736 | 1.60311 | 60.7 |

-continued

| | r | d | n | ν |
|---|---|---|---|---|
| 36 | −109.249 | | | |
| | | 0.2 | | |
| 37 | 146.829 | | | |
| | | 11.823 | 1.60311 | 60.7 |
| 38 | −139.73 | | | |
| | | 3 | 1.80518 | 25.4 |
| 39 | 1373.05 | | | |
| | | 0.2 | | |
| 40 | 129.318 | | | |
| | | 7.872 | 1.60311 | 60.7 |
| 41 | 1539.52 | | | |
| | | 29.808 | | |
| 42 | 110.432 | | | |
| | | 3 | 1.71736 | 29.5 |
| 43 | 70.8992 | | | |
| | | 6.566 | | |
| 44 | 162.808 | | | |
| | | 6.778 | 1.51633 | 64.1 |
| 45 | −360.162 | | | |
| | | 0.2 | | |
| 46 | 79.4534 | | | |
| | | 7.974 | 1.51633 | 64.1 |
| 47 | 347.566 | | | |
| | | 20 | | |
| *{ 48 | ∞ | | | |
| | | 69.2 | 1.51633 | 64.1 |
| 49 | ∞ | | | | where the values with * marks indicate the shortest middle and longest focal distances. The asterisk marks ※ indicate a color resolving prism system. r is a radius of curvature, d is a plane separation or lens thickness, n is a refractive index and ν is dispersion.

8. A zoom lens having wide variation range, which comprises a front zoom part containing a focusing lens group, a variator lens group and a compensator lens group said variator lens group and said compensator lens group being displaced simultaneously with as well as independently of each other, and a rear zoom part positioned behind said front zoom part, and containing a fixed lens group, at least two divergent movable lens groups and a fixed relay lens group, said divergent movable lens group being displaced simultaneously with as well as independently of each other, wherein the movable lens group of said two divergent movable lens groups placed at a position closer to the image plane is a lens group to vary the focal length while the movable lens group closer to an object is a lens group for compensation for the shifting of the image plane in the direction of optical axis said groups forming a system having a plurality of lenses with the following characteristics:

| | r | d | n | ν |
|---|---|---|---|---|
| 1 | 1086.39 | | 1.7552 | 27.5 |
| | | 8 | | |
| 2 | 283.68 | | | |
| | | 1.48 | | |
| 3 | 280.91 | | 1.51633 | 64.1 |
| | | 23.31 | | |
| 4 | −1173.26 | | | |
| | | 0.2 | | |
| 5 | 289.546 | | 1.51633 | 64.1 |
| | | 17.62 | | |
| 6 | 1566.37 | | | |
| | | 0.2 | | |
| 7 | 278.268 | | 1.51633 | 64.1 |
| | | 13.27 | | |
| | 921.892 | | | |
| | ( 0.5517 − 183.9578 − 228.8848 ) | | | |
| 9 | 364.93 | | 1.816 | 46.8 |
| | | 3 | | |
| 10 | 70.69 | | | |
| | | 9 | | |
| 11 | −87 | | 1.816 | 46.8 |
| | | 2.52 | | |
| 12 | 96.245 | | 1.92286 | 20.9 |
| | | 6 | | |
| 13 | −788.25 | | | |

-continued

| | r | d | n | ν |
|---|---|---|---|---|
| | ( 235.6815 – 29.5934 – 7.3484 ) | | | |
| 14 | −101.8 | | 1.7859 | 44.2 |
| | | 3.02 | | |
| 15 | 100.08 | | 1.80518 | 25.4 |
| | | 10 | | |
| 16 | −3088 | | | |
| | ( 5.9945 – 28.6778 – 5.9945 ) | | | |
| 17 | −2040 | | 1.48749 | 70.1 |
| | | 6 | | |
| 18 | −104.18 | | | |
| | | 0.2 | | |
| 19 | 261.69 | | 1.48749 | 70.1 |
| | | 6.5 | | |
| 20 | −200.33 | | | |
| | | 4.78 | | |
| 21 | 202.224 | | 1.60311 | 60.7 |
| | | 13.37 | | |
| 22 | −97.715 | | 1.80518 | 25.4 |
| | | 3.5 | | |
| 23 | −786.13 | | | |
| | | 0.2 | | |
| 24 | 73.177 | | 1.7552 | 27.5 |
| | | 3 | | |
| 25 | 52.795 | | 1.62041 | 60.3 |
| | | 10.43 | | |
| 26 | 325.572 | | | |
| | ( 10.0755 – 14.3473 – 13.5601 ) | | | |
| 27 | 112.893 | | 1.71736 | 29.5 |
| | | 6.59 | | |
| 28 | −326.227 | | 1.72 | 50.3 |
| | | 2.5 | | |
| 29 | 52.351 | | | |
| | ( 5.9359 – 39.0442 – 62.4514 ) | | | |
| 30 | 103.145 | | 1.92286 | 21.3 |
| | | 5.75 | | |
| 31 | 676.097 | | 1.816 | 46.8 |
| | | 2.5 | | |
| 32 | 67.592 | | | |
| | | 7.06 | | |
| 33 | −87.405 | | 1.816 | 46.8 |
| | | 2.5 | | |
| 34 | −949.076 | | | |
| | ( 62 – 24.6 – 2 ) | | | |
| 35 | −521.814 | | 1.60311 | 60.7 |
| | | 7.39 | | |
| 36 | −106.58 | | | |
| | | 0.2 | | |
| 37 | 154.335 | | 1.60311 | 60.7 |
| | | 12.72 | | |
| 38 | −137.301 | | 1.80518 | 25.4 |
| | | 3 | | |
| 39 | 1437.934 | | | |
| | | 0.2 | | |
| 40 | 129.132 | | 1.60311 | 60.7 |
| | | 8.55 | | |
| 41 | 8613.412 | | | |
| | | 30.01 | | |
| 42 | 92.371 | | 1.71736 | 29.5 |
| | | 3 | | |
| 43 | 68.499 | | | |
| | | 8.43 | | |
| 44 | 319.795 | | 1.51633 | 64.1 |
| | | 3.77 | | |
| 45 | 396.717 | | | |
| | | 0.2 | | |
| 46 | 70.644 | | 1.51633 | 64.1 |
| | | 7.94 | | |
| 47 | 348.921 | | | |
| | | 23 | | |
| 48 | ∞ | | 1.51633 | 64.1 |
| | | 69.2 | | |
| 49 | ∞ | | | | where:
The values with * marks indicate the shortest, middle and longest focal distances. The asterisk marks indicate a color resolving prism system. r is a radius of curvature, d is a plane separation or lens thickness, n is refractive index and ν is dispersion.

9. A zoom lens having wide variation range, which comprises a front zoom part containing a focusing lens group, a variator lens group and a compensator lens group said variator lens group and said compensator lens group being displaced simultaneously with as well as independently of each other, and a rear zoom part positioned behind said front zoom part and containing a fixed lens group, at least two divergent movable lens groups and a fixed relay lens group, said divergent movable lens group being displaced simultaneously with as well as independently of each other, wherein the movable lens group of said two divergent movable lens groups placed at a position closer to the image plane is a lens group to vary the focal length while the movable lens group closer to an object is a lens group for compensation for the shifting of the image plane in the direction of optical axis said groups form a system having a plurality of lenses with the following characteristics:

| | r | d | n | μ |
|---|---|---|---|---|
| 1 | 1086.39 | | 1.7552 | 27.5 |
| | | 8 | | |
| 2 | 283.68 | | | |
| | | 1.48 | 1.51633 | 64.1 |
| 3 | 280.91 | | | |
| | | 23.31 | | |
| 4 | −1173 | | | |
| | | 0.2 | 1.51633 | 64.1 |
| 5 | 289.546 | | | |
| | | 17.62 | | |
| 6 | 1566.37 | | | |
| | | 0.2 | 1.51633 | 64.1 |
| 7 | 278.268 | | | |
| | | 13.27 | | |
| 8 | 921.723 | | 1.816 | 46.8 |
| | ( 0.551 – 183.9571 – 228.884 ) | | | |
| 9 | 364.93 | | | |
| | | 3 | | |
| 10 | 70.69 | | | |
| | | 9 | | |
| 11 | −87 | | 1.816 | 46.8 |
| | | 2.52 | | |
| 12 | 96.245 | | 1.92286 | 20.9 |
| | | 6 | | |
| 13 | −788.25 | | | |
| | ( 235.6815 – 29.5934 – 7.3484 ) | | | |
| 14 | −101.8 | | 1.7859 | 44.2 |
| | | 3.02 | | |
| 15 | 100.08 | | 1.80518 | 25.4 |
| | | 10 | | |
| 16 | −3088 | | | |
| | ( 5.9945 – 28.6778 – 5.9945 ) | | | |
| 17 | −2040 | | 1.48749 | 70.1 |
| | | 6 | | |
| 18 | −104.18 | | | |
| | | 0.2 | | |
| 19 | 261.69 | | 1.48749 | 70.1 |
| | | 6.5 | | |
| 20 | −200.33 | | | |
| | | 9.11 | | |
| 21 | 148.764 | | | |
| | | 11.38 | 1.64 | 60.2 |
| 22 | −96.819 | | 1.80518 | 25.4 |
| | | 3.5 | | |
| 23 | −786.13 | | | |
| | | 0.2 | | |
| 24 | 63.7 | | 1.80518 | 25.4 |
| | | 3 | | |
| 25 | 52.23 | | 1.67 | 57.4 |
| | | 11.04 | | |
| 26 | 634.933 | | | |
| | ( 20.5044 – 25.3528 – 23.0322 ) | | | |
| 27 | 6990.557 | | 1.71736 | 29.5 |
| | | 3.31 | | |
| 28 | 8734.535 | | 1.72 | 50.3 |
| | | 2.5 | | |
| 29 | 141.047 | | | |
| | ( 4.1573 – 4.7089 – 12.4295 ) | | | |
| 30 | 235.509 | | 1.92286 | 20.9 |
| | | 4.06 | | |
| 31 | −132.187 | | 1.816 | 46.8 |
| | | 2.5 | | |
| 32 | 39.589 | | | |
| | | 8.93 | | |
| | 4.352 | | 1.816 | 46.8 |
| | | 2.5 | | |
| 34 | 176.636 | | | |
| | | 9 | | |
| 35 | −59.367 | | 1.816 | 46.8 |
| | | 2.5 | | |
| 36 | −2642.876 | | | |
| | ( 12.8 – 7.4 – 2 ) | | | |
| 37 | −753.452 | | 1.60311 | 60.7 |
| | | 15.46 | | |
| 38 | −49.472 | | | |
| | | 0.2 | | |
| 39 | 133.874 | | 1.60311 | 60.7 |
| | | 11.06 | | |

-continued

| | r | d | n | μ |
|---|---|---|---|---|
| 40 | −287.402 | | 1.80518 | 25.4 |
| | | 3.0 | | |
| 41 | 521.457 | | | |
| | | 0.2 | | |
| 42 | 135.472 | | 1.60311 | 60.7 |
| | | 7.84 | | |
| 43 | −26689.125 | | | |
| | | 35.73 | | |
| 44 | 163.529 | | 1.71736 | 29.5 |
| | | 3 | | |
| 45 | 68.35 | | | |
| | | 8.24 | | |
| 46 | 149.667 | | 1.51633 | 64.1 |
| | | 12.82 | | |

-continued

| | r | d | n | μ |
|---|---|---|---|---|
| 47 | −151.699 | | | |
| | | 0.2 | | |
| 48 | 58.946 | | 1.51633 | 64.1 |
| | | 15.84 | | |
| 49 | 362.778 | | | |
| | | 23 | | |
| 50 | ∞ | | 1.51633 | 64.1 |
| | | 69.2 | | |
| 51 | ∞ | | | | where:
The values with * marks indicate the shortest, middle and longest focal distances. The asterisk marks indicate a color resolving prism system. r is a radius of curvature, d is a plane separation or lens thickness, n is refractive index and ν is dispersion.

* * * * *